US008806895B2

(12) United States Patent
Eda et al.

(10) Patent No.: US 8,806,895 B2
(45) Date of Patent: Aug. 19, 2014

(54) MANUFACTURING METHOD FOR A GLASS SUBSTRATE FOR MAGNETIC DISK

(75) Inventors: Shinji Eda, Nirasaki (JP); Hideki Isono, Kofu (JP); Akira Murakami, Akiruno (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 13/313,593

(22) Filed: Dec. 7, 2011

(65) Prior Publication Data

US 2012/0144865 A1 Jun. 14, 2012

Related U.S. Application Data

(60) Provisional application No. 61/421,430, filed on Dec. 9, 2010.

(51) Int. Cl.

| | |
|---|---|
| *C03B 11/08* | (2006.01) |
| *C03B 7/12* | (2006.01) |
| *C03B 7/11* | (2006.01) |
| *C03B 11/05* | (2006.01) |
| *C03B 11/12* | (2006.01) |
| *C03C 19/00* | (2006.01) |
| *C03C 21/00* | (2006.01) |

(52) U.S. Cl.
CPC . *C03B 7/11* (2013.01); *C03B 11/05* (2013.01); *C03B 11/088* (2013.01); *C03B 11/122* (2013.01); *C03B 2215/70* (2013.01); *C03C 19/00* (2013.01); *C03C 21/002* (2013.01)
USPC .................................. 65/133; 65/332; 65/127

(58) Field of Classification Search
CPC ................. C03B 7/10; C03B 7/11; C03B 7/12
See application file for complete search history.

(56) References Cited

U.S. PATENT DOCUMENTS 1,587,985 A * 6/1926 Peiler ............................... 65/133
1,869,921 A * 8/1932 Soubier ........................... 65/332
(Continued)

FOREIGN PATENT DOCUMENTS

JP 01294543 A * 11/1989 ................ C03B 7/12
JP 3709033 B2 7/1998
(Continued)

OTHER PUBLICATIONS

JP10-203832 machine translation provided by http://dossierl .ipdl. inpit.go.jp/AIPN/odse call transl.ipdl?NOOOO=7413 &NOOO5=Ei7BzenZVnBvfz7D1ZIK&NO120=01N2001 =2& N3001=1998-203832&Ntt3=electronicsV14&Ntt4=machineV14 &Ntt5=chemistryV 14&Ntt6=&Ntt7=&Ntt8=&Ntt9=&Ntt 10=&Nttl 1 =&Nttl 2= as viewed on Jan. 31, 2013.*

*Primary Examiner* — Jodi C Franklin
(74) *Attorney, Agent, or Firm* — Global IP Counselors, LLP

(57) ABSTRACT

The present invention provides a manufacturing method of a sheet glass material excellent in flatness. A manufacturing method of glass substrate for magnetic disk including a pair of principal surfaces, the method comprising the steps of: dropping process for dropping a lump of molten glass; pressing process for forming a sheet glass material by performing press forming to the lump while sandwiching the lump from both sides of the dropping path of the lump with facing surfaces of a pair of dies, the pair of dies being set to substantially the same temperature; and processing process for processing the sheet glass material, while the lump drops down while revolving around its dropping axis.

14 Claims, 10 Drawing Sheets

(56) References Cited

U.S. PATENT DOCUMENTS

| | | | |
|---|---|---|---|
| 3,351,449 A * | 11/1967 | Ambrogi | 65/122 |
| 3,918,951 A * | 11/1975 | Kitayama et al. | 65/334 |
| 4,015,967 A * | 4/1977 | Ward, Jr. | 65/133 |
| 4,450,741 A * | 5/1984 | Mumford | 83/623 |
| 4,475,938 A * | 10/1984 | Knoth | 65/334 |
| 5,336,289 A * | 8/1994 | Yeom et al. | 65/334 |
| 5,588,979 A * | 12/1996 | Miyazaki et al. | 65/164 |
| 5,588,980 A * | 12/1996 | Ito | 65/223 |
| 5,766,293 A * | 6/1998 | Gearing | 65/68 |
| 5,846,283 A * | 12/1998 | Struckmeier et al. | 65/165 |
| 5,987,925 A * | 11/1999 | Flynn | 65/174 |
| 6,442,975 B1 * | 9/2002 | Murakami et al. | 65/61 |
| 6,626,010 B1 * | 9/2003 | Yoshida | 65/25.1 |
| 6,701,750 B2 * | 3/2004 | Maeda et al. | 65/103 |
| 7,065,984 B2 * | 6/2006 | Kezuka et al. | 65/61 |
| 7,313,930 B2 * | 1/2008 | Kainuma et al. | 65/102 |
| 7,328,641 B2 * | 2/2008 | Kawachi | 83/597 |
| 7,845,192 B2 * | 12/2010 | Murakami | 65/102 |
| 2001/0049031 A1 * | 12/2001 | Bajorek et al. | 428/694 ST |
| 2002/0062661 A1 * | 5/2002 | Uezaki et al. | 65/25.1 |
| 2002/0139145 A1 * | 10/2002 | Murakami | 65/102 |
| 2003/0051508 A1 * | 3/2003 | Uezaki et al. | 65/66 |
| 2003/0134734 A1 * | 7/2003 | Nishimoto et al. | 501/69 |
| 2004/0194506 A1 * | 10/2004 | Ueda et al. | 65/29.11 |
| 2004/0237592 A1 * | 12/2004 | Iguchi et al. | 65/127 |
| 2005/0204777 A1 * | 9/2005 | Mori et al. | 65/112 |
| 2005/0210923 A1 * | 9/2005 | Yamashita et al. | 65/61 |
| 2006/0230891 A1 * | 10/2006 | Kawachi | 83/13 |
| 2006/0260361 A1 * | 11/2006 | Yoshida et al. | 65/67 |
| 2007/0044515 A1 * | 3/2007 | Pfeiffer | 65/66 |
| 2009/0038743 A1 * | 2/2009 | Suzuki et al. | 156/154 |
| 2009/0239035 A1 * | 9/2009 | Nagai et al. | 428/141 |
| 2009/0255298 A1 * | 10/2009 | Balbi | 65/133 |
| 2011/0135963 A1 * | 6/2011 | Nagashima et al. | 428/836 |
| 2011/0283739 A1 * | 11/2011 | Osawa et al. | 65/60.1 |
| 2012/0144865 A1 * | 6/2012 | Eda et al. | 65/92 |
| 2012/0151967 A1 * | 6/2012 | Eda et al. | 65/92 |
| 2012/0204601 A1 * | 8/2012 | Murakami | 65/29.1 |
| 2012/0247155 A1 * | 10/2012 | Murakami et al. | 65/60.1 |

FOREIGN PATENT DOCUMENTS

| | | | | |
|---|---|---|---|---|
| JP | 10203832 A | * | 8/1998 | C03B 11/00 |
| JP | 2011207738 A | * | 10/2011 | |

* cited by examiner

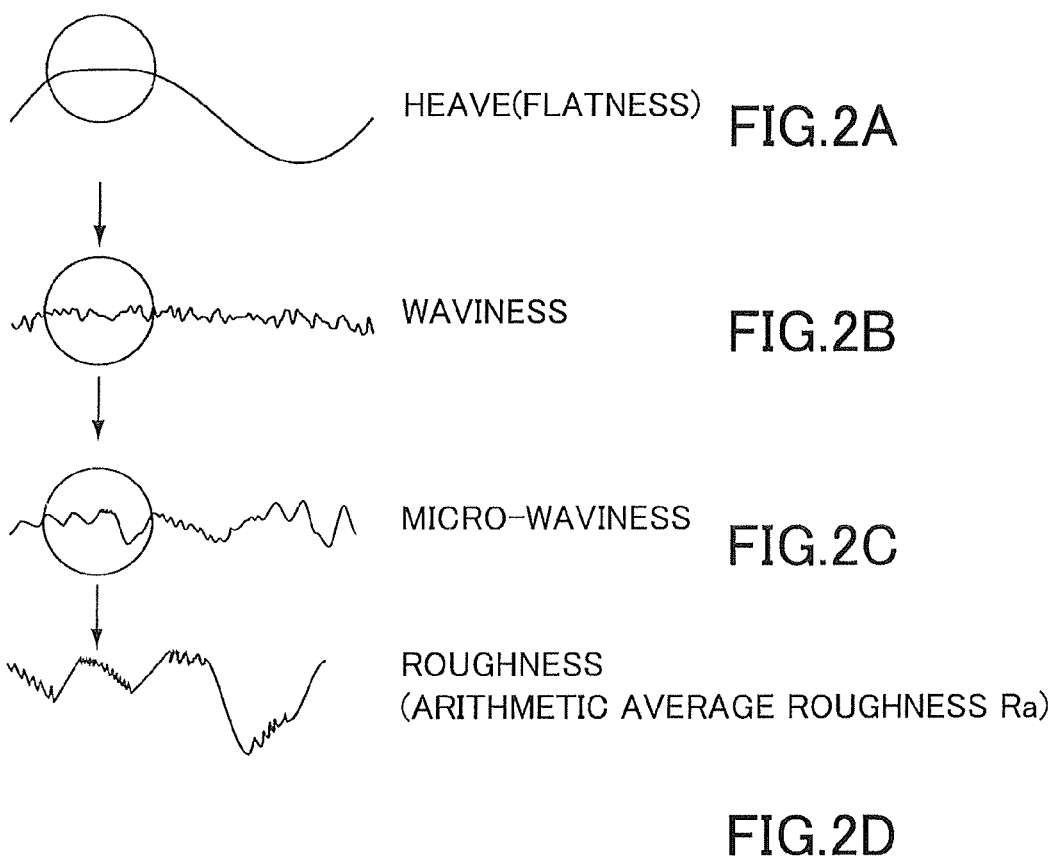

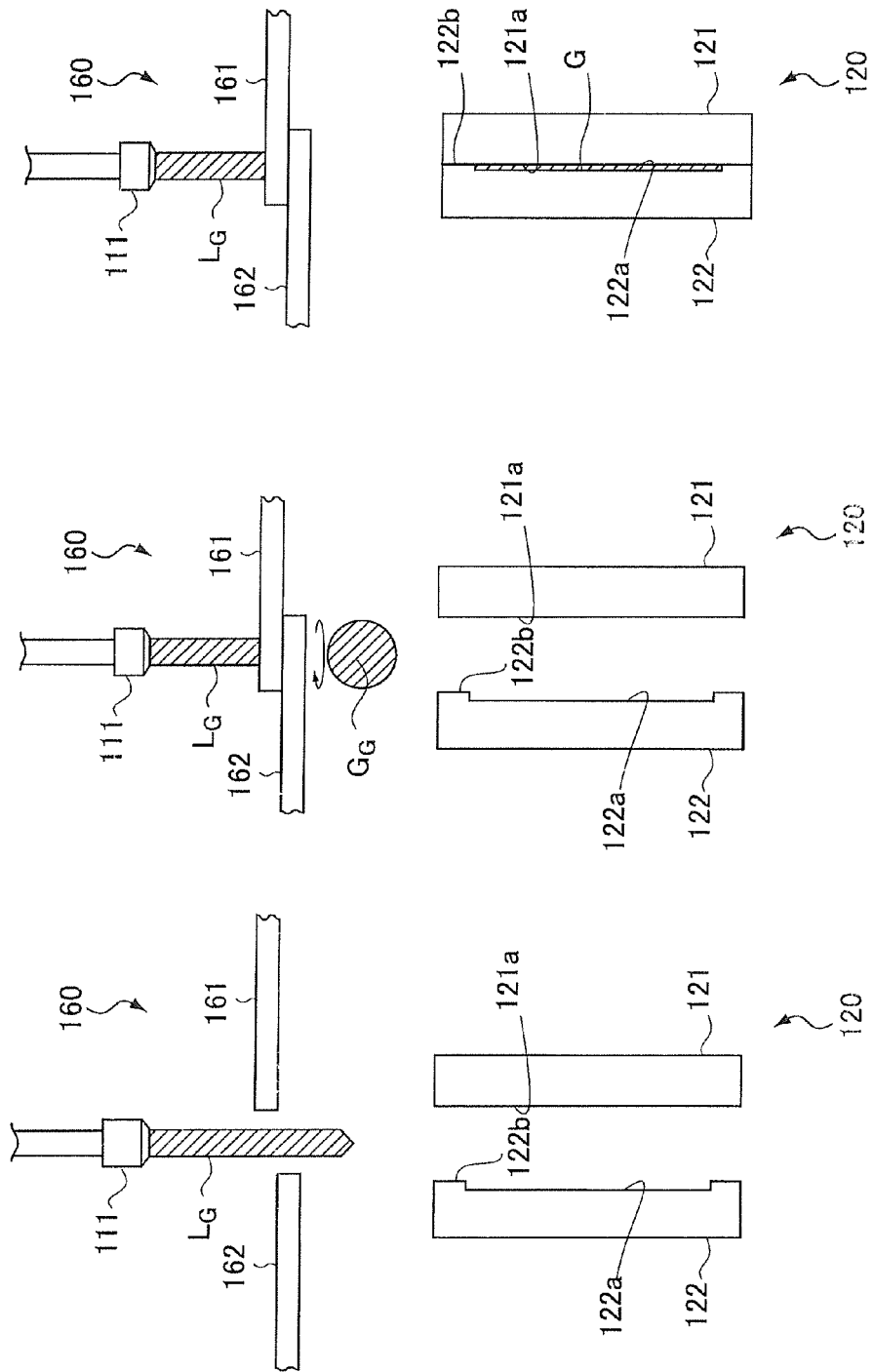

MANUFACTURING METHOD FOR A GLASS SUBSTRATE FOR MAGNETIC DISK

CROSS-REFERENCE TO RELATED APPLICATIONS

This application is based upon and claims the benefit of priority of the U.S. Provisional Application No. 61/421,430 filed in the US Patent and Trademark Office on Dec. 9, 2010, the entire contents of which are incorporated herein by reference.

FIELD

The present invention relates to a manufacturing method for a glass substrate for magnetic disk having a pair of principal surfaces.

BACKGROUND

Recently, a hard disk device is incorporated in a personal computer, a notebook personal computer, and a DVD (Digital Versatile Disc) recording apparatus in order to record data. Particularly, in the hard disk device used in an apparatus such as the notebook personal computer based on portability, a magnetic disk in which a magnetic layer is provided on a glass substrate is used, and magnetic recording information is recorded in or read from a magnetic layer using a magnetic head (DFH (Dynamic Flying Height) head) that is slightly floated on a surface of the magnetic disk surface. A glass substrate is suitably used as the substrate for the magnetic disk because a glass substrate is hardly plastically deformed compared with a metallic substrate.

The magnetic recording density is being increased in order to respond to a demand for an increase of a storage capacity in the hard disk device. For example, a magnetic recording information area is finely formed using a perpendicular magnetic recording system in which a magnetization direction of the magnetic layer is oriented toward a direction perpendicular to the substrate surface, which allows the storage capacity to be increased in a single disk substrate. In order to respond to the further increase of the storage capacity, a floating distance of the magnetic head from the magnetic recording surface is extremely shortened to form the fine magnetic recording information area. With such substrate of the magnetic disk, the magnetic layer is formed flat such that the magnetization direction of the magnetic layer is oriented toward the direction substantially perpendicular to the substrate surface. Therefore, the glass substrate is formed such that surface irregularity of the glass substrate is decreased as much as possible.

The shortened floating distance of the magnetic head may easily cause a head crush trouble or a thermal asperity trouble. Because these troubles are caused by the micro irregularity or a particle on the magnetic disk surface, the glass substrate is formed such that the surface irregularity of an end face is also decreased as much as possible in addition to that of the principal surface.

For example, the glass substrate used in the magnetic disk is manufactured by the following method: specifically, a glass gob made of molten glass is supplied onto a lower die that is a backing gob forming die; press forming is performed to the glass gob to prepare a sheet glass material using the lower die and an upper die that is a counter gob forming die; and the sheet glass material is formed into a glass substrate for information recording medium (for example, see Japanese Patent No. 3709033).

With the method disclosed in the Japanese Patent No. 3709033, after the glass gob made of the molten glass is supplied onto the lower die, the following steps are performed: a lower surface of a body for upper die and an upper surface of a body for lower die are abutted on together; a thin sheet glass forming space is formed outside a sliding surface between the upper die and the body for upper die and a sliding surface between the lower die and the body for lower die; the upper die is moved down to perform the press forming; and the upper die is moved up immediately after the press forming. Therefore, the sheet glass material that becomes a base of the glass substrate for magnetic disk is formed. Then, the glass substrate for magnetic disk is obtained through a grinding process and a polishing process.

In the grinding process, for example, grinding is performed using an alumina loose abrasive grain. In the grinding process, a first grinding process and a second grinding process are performed using the loose abrasive grains having different particle sizes. A particle size of the loose abrasive grain used in the second grinding process is set smaller than that of the loose abrasive grain used in the first grinding process. Therefore, the coarse grinding and the fine grinding are performed in this order.

The polishing process includes a first polishing process in which the loose abrasive grain such as a cerium oxide and a hard resin material polisher are used and a second polishing process in which colloidal silica and a soft resin material polisher are used. The particle size of the abrasive grain used in the first polishing process is smaller than that of the abrasive grain used in the second grinding process of the grinding process. The particle size of the abrasive grain used in the second polishing process is smaller than that of the abrasive grain used in the first polishing process.

Thus, in the surface processing of the glass substrate, the first grinding process, the second grinding process, the first polishing process, and the second polishing process are performed in this order, and the glass substrate is formed such that surface quality such as surface roughness of the glass substrate is gradually enhanced.

SUMMARY

Here, in forming the sheet glass material, a mold release agent is applied to the die surface in order to prevent the glass material from fusing to the die surfaces of the upper die and lower die. The surface roughness of the principal surface of the sheet glass material is increased because of the mold release agent. In another aspect, there is a large surface temperature difference between the upper die and the lower die, and the lower die to which the glass gob (a lump of the glass material) is supplied becomes high temperature. Because the surface temperature difference causes a temperature distribution in a thickness direction of the formed sheet glass material and in a plane of the plate, a shrinkage quantity of the sheet glass material that is taken out from the die and cooled also has a distribution in the thickness direction of the formed sheet glass material and in the plane of the plate. Therefore, the sheet glass material is easy to warp, and flatness of the formed sheet glass material is not satisfactory.

The flatness of the sheet glass material may be improved by the grinding (first grinding process). For example, in the grinding process, a machining allowance (ground quantity) is increased in order to improve the flatness. However, when the machining allowance is increased in the grinding process, a deep crack may be generated in the surface of the sheet glass material. Therefore, in the polishing process, which is a post-process of the grinding process, the machining allowance (polishing quantity) is also inevitably increased in an attempt to remove the deep crack. When the machining allowance is increased in the polishing process in which the loose abrasive grain and the resin polisher are used, the neighboring portion of the outer circumferential edge portion is rounded on the principal surface of the sheet glass material, thereby causing "roll-off problem" of the edge portion. That is, because the neighboring portion of the outer circumferential edge portion is rounded in the sheet glass material, a distance between the magnetic layer and the magnetic head in the vicinity of the outer circumferential edge portion becomes larger than the floating distance of the magnetic head in another portion of the glass substrate when the magnetic disk is prepared using the sheet glass material as the glass substrate. The surface irregularity is generated because the neighboring portion of the outer circumferential edge portion has the rounded shape. As a result, the recording and reading operations of the magnetic head may not be precisely performed in the magnetic layer in the neighboring portion of the outer circumferential edge portion. This is the "roll-off problem".

Further, when the machining allowance is increased in the polishing process, a period required for the polishing process is unfavorably lengthened.

In view of the above, an object of the present invention is to provide a manufacturing method for sheet glass material excellent in flatness, thereby efficiently manufacturing a glass substrate for magnetic disk, the principal surface of which has suppressed surface irregularity.

In order to solve the problem, manufacturing method for a glass substrate for magnetic disk according to the present invention is a manufacturing method of glass substrate for magnetic disk including a pair of principal surfaces, the method comprising the steps of: dropping process for dropping a lump of molten glass; pressing process for forming a sheet glass material by performing press forming to the lump while sandwiching the lump from both sides of the dropping path of the lump with facing surfaces of a pair of dies, the pair of dies being set to substantially the same temperature; and processing process for processing the sheet glass material, while the lump drops down while revolving around its dropping axis.

Preferably, the dropping process includes cutting process for cutting molten glass with a first cutting blade and a second cutting blade intersected, the first cutting blade and the second cutting blade have shapes so as to cut the molten glass while revolving around its dropping axis.

Preferably, temperature of the pair of dies is lower than a glass transition temperature of the glass.

Preferably, the glass contains by molar percent, when converting to oxide standard, 50 to 75% $SiO_2$, 1 to 15% $Al_2O_3$, totally 12 to 35% component(s) selected from at lease one of $Li_2O$, $Na_2O$, and $K_2O$, totally 0 to 20% component(s) selected from at lease one of MgO, CaO, SrO, BaO, and ZnO, and totally 0 to 10% component(s) selected from at lease one of $ZrO_2$, $TiO_2$, $La_2O_3$, $Y_2O_3$, $Ta_2O_5$, $Nb_2O_5$ $HfO_2$.

Preferably, viscosity of the molten glass ranges from 500 dPa·s to 1,050 dPa·s.

Preferably, the pair of dies are opened immediately after the press forming of the lump and press forms the subsequently dropping lump of molten glass.

Preferably, the processing process includes grinding process for grinding the principal surfaces using a fixed abrasive grain, and a polishing process for polishing the principal surfaces using a loose abrasive grain.

The object and advantages of the invention will be realized and attained by means of the elements and combinations particularly pointed out in the claims.

It is to be understood that both the foregoing general description and the following detailed description are exemplary and are not restrictive of the invention, as claimed.

BRIEF DESCRIPTION OF THE DRAWINGS

Referring now to the attached drawings which form a part of this original disclosure:

FIG. 2A to FIG. 2D are views illustrating surface irregularity in a sheet glass material or a glass substrate;

FIG. 7A is a side view illustrating an arrangement before the molten glass and a cutting unit contact;

FIG. 7B is a side view illustrating an arrangement after the cutting unit cut the molten glass;

FIG. 7C is a side view illustrating an arrangement when a pressing unit performs press forming for a lump of the molten glass;

DESCRIPTION OF EMBODIMENT(S)

A manufacturing method of glass substrate for magnetic disk and a glass substrate for magnetic disk according to an embodiment of the present invention will be described in detail below.

(Magnetic Disk and Glass Substrate for Magnetic Disk)

Figure 1A:
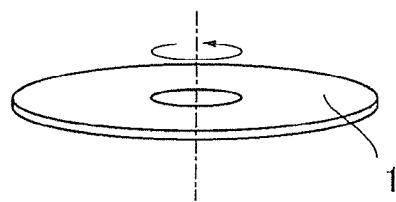
FIG. 1A is a view illustrating a magnetic disk prepared using a glass substrate for magnetic disk according to an embodiment of the invention.
Figure 1B:
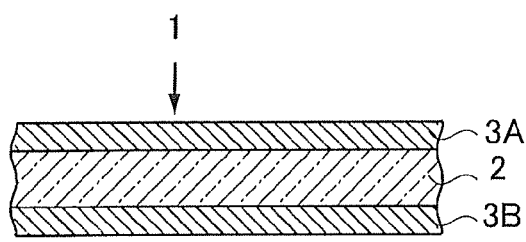
FIG. 1B is a view illustrating a section of the magnetic disk.
Figure 1C:
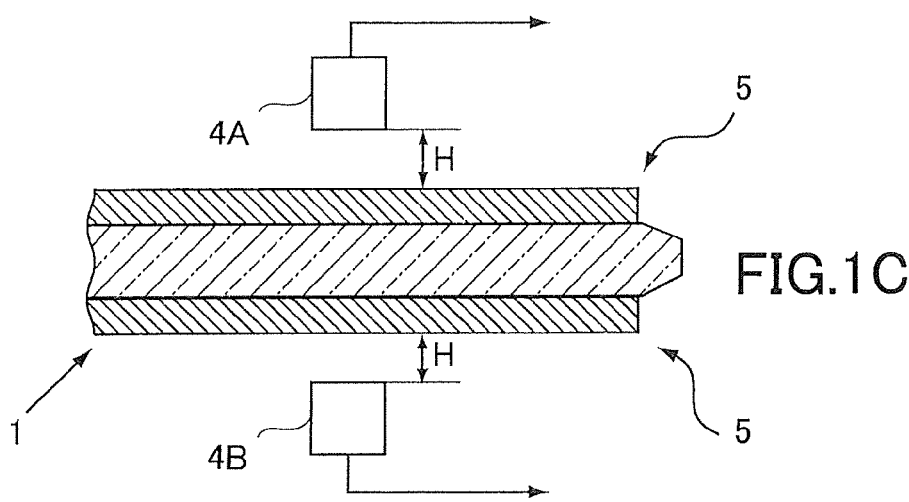
FIG. 1C is a view illustrating an arrangement in which a magnetic head is floated above the surface of the magnetic disk.

Referring now to FIG. 1A to FIG. 1C, a magnetic disk manufactured using a glass substrate for magnetic disk will be explained. FIG. 1A is a view illustrating a magnetic disk prepared using a glass substrate for magnetic disk according to an embodiment of the invention. FIG. 1B is a view illustrating a section of the magnetic disk. FIG. 1C is a view illustrating an arrangement in which a magnetic head is floated above the surface of the magnetic disk.

As illustrated in FIG. 1A, a magnetic disk 1 is a ring-shaped, and is driven around its axis of rotation. As illustrated in FIG. 1B, the magnetic disk 1 has a glass substrate 2 and at least magnetic layers 3A, 3B.

Note that, except the magnetic layers 3A, 3B, although not illustrated in FIG. 1, an adhesive layer, a soft magnetic layer, a non-magnetic underlying layer, the perpendicular magnetic recording layer, a protective layer, and a lubricant layer are deposited. For example, a Cr alloy is applied for the adhesive layer, and the adhesive layer acts as a bonding layer to the glass substrate 2. For example, a CoTaZr alloy is applied for the soft magnetic layer, a granular non-magnetic layer is applied for the non-magnetic underlying layer, and a granular magnetic layer is applied for the perpendicular magnetic recording layer. For example, a material containing carbon hydride is applied for the protective layer, and a fluorine resin is applied for the lubricant layer.

The magnetic disk 1 will be described with a more specific example. A CrTi adhesive layer, a CoTaZr/Ru/CoTaZr soft magnetic layer, a CoCrSiO$_2$ granular non-magnetic underlying layer, a CoCrPt—SiO$_2$·TiO$_2$ granular magnetic layer, and a carbon hydride protective layer are sequentially deposited in both the principal surfaces of the glass substrate 2 with an in-line type sputtering apparatus. A perfluoropolyether lubricant layer is deposited on the deposited uppermost layer by a dipping method.

The magnetic disk 1 rotates around the axis of rotation with rotation speed of 7,200 rpm, for example. As illustrated in FIG. 1C, magnetic heads 4A and 4B of a hard disk device float from surfaces of the magnetic disk 1 by a distance H. The distance H is 5 nm for example. At this point, the magnetic heads 4A and 4B record and read pieces of information in and from the magnetic layers. The floating of the magnetic heads 4A and 4B record and read the information in and from the magnetic layer of the magnetic disk 1 at a short distance without sliding the magnetic heads 4A and 4B onto the magnetic layer, thereby realizing a fine magnetic recording information area and high density of the magnetic recording.

A central portion of the glass substrate 2 of the magnetic disk 1 to an outer circumferential edge portion 5 are precisely processed with target surface accuracy, and the magnetic heads 4A and 4B can be therefore precisely operated while the distance H of 5 nm is maintained.

As will be explained later, surface irregularity of the glass substrate 2 is processed by grinding using a fixed abrasive grain obtaining a small machining allowance, and subsequently processed by first polishing and second polishing, in which the machining allowance can be decreased as a result of the grinding. Accordingly, the conventional "roll-off problem" is resolved.

Regarding surface irregularity of the principal surface of the glass substrate 2 used in the magnetic disk 1, flatness is 4 μm or less, and surface roughness is 0.2 nm or less. The flatness of 4 μm or less is target flatness required for the glass substrate for magnetic disk as a final product.

The flatness can be measured with a flatness tester FT-900 manufactured by NIDEK CO., LTD. for example.

The roughness of the principal surface (arithmetic average roughness Ra) can be measured with a scanning probe microscope (atomic force microscope) manufactured by SII Nano Technology Inc, and can be computed by a method defined by JIS R1683:2007.

Here, with reference to FIG. 2A to FIG. 2D, surface irregularity of a sheet glass material or a glass substrate will be explained. FIG. 2A to FIG. 2D are views for explaining the surface irregularity. The surface irregularity can be classified into four irregularities according to a wavelength of the irregularity.

Specifically, the surface irregularity is classified into heave having the largest wavelength (wavelength of about 0.6 μm to about 130 mm), waviness (wavelength of about 0.2 μm to about 2 mm), micro-waviness (wavelength of 0.1 μm to 1 mm), and roughness (wavelength of 10 nm or less).

The heave can be expressed by the flatness as an index, and the roughness can be expressed by the arithmetic average roughness Ra as an index.

As described above, because the flatness of the conventional sheet glass material is not satisfactory, machining allowance needs to be increased in the grinding process and the polishing process, thereby causing the roll-off problem.

Thus, in order to solve the above problem, the present invention improve the flatness of the sheet glass material such that machining allowance is decreased in the grinding process and the polishing process, thereby restraining occurrence of the roll-off problem.

Aluminosilicate glass, soda-lime glass, and borosilicate glass can be used as a material for the glass substrate 2 of the magnetic disk 1. Particularly, the aluminosilicate glass can be suitably used in that chemically strengthening can be performed and in that the glass substrate for magnetic disk excellent for the flatness of the principal surface and the strength of the substrate can be prepared.

Aluminosilicate glass is preferably used containing by molar percent of 50 to 75% SiO$_2$, 1 to 15% Al$_2$O$_3$, totally 12 to 35% component(s) selected from at lease one of Li$_2$O, Na$_2$O, and K$_2$O, totally 0 to 20% component(s) selected from at lease one of MgO, CaO, SrO, BaO, and ZnO, and totally 0 to 10% component(s) selected from at lease one of ZrO$_2$, TiO$_2$, La$_2$O$_3$, Y$_2$O$_3$, Ta$_2$O$_5$, Nb$_2$O$_5$, HfO$_2$. A chemically strengthened glass material may be used mainly containing by molar percent of 57 to 74% SiO$_2$, 0 to 2.8% ZnO$_2$, 3 to 15% Al$_2$O$_3$, 7 to 16% Li$_2$O, 4 to 14% Na$_2$O, is suitably used as the aluminosilicate glass.

(Manufacturing Method of Glass Substrate for Magnetic Disk)

Figure 3:
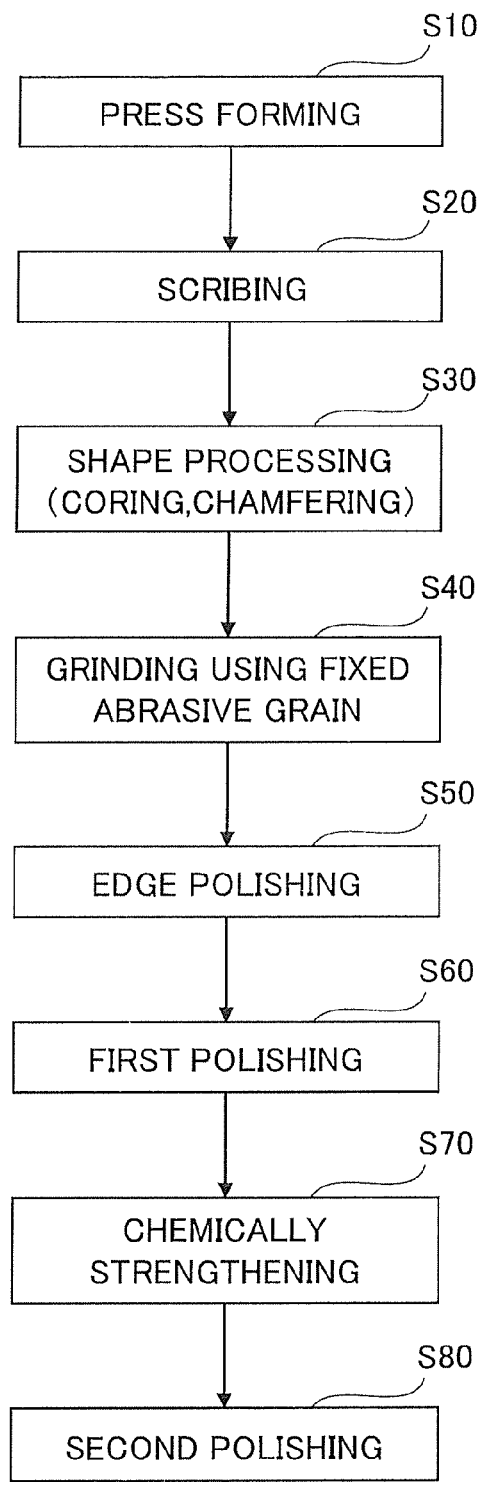
FIG. 3 is a view illustrating a flow of a manufacturing method of glass substrate for magnetic disk according to an embodiment of the invention.

Next, with reference to FIG. 3, a flow of a manufacturing method of glass substrate for magnetic disk will be explained. FIG. 3 is a view illustrating a flow of a embodiment of a manufacturing method of glass substrate for magnetic disk.

As illustrated in FIG. 3, the sheet glass material is manufactured by the press forming (Step S10). Next, the formed sheet glass material is scribed (Step S20). Next, the scribed sheet glass material is shape-processed (Step S30). Next, grinding is performed to the sheet glass material using the fixed abrasive grain (Step S40). Then, edge polishing is performed to the sheet glass material (Step S50). The first polishing is performed to the principal surface of the sheet glass material (Step S60). Next, after the first polishing, the sheet glass material is chemically strengthened (Step S70). Then, the second polishing is performed to the chemically strengthened sheet glass material (Step S80).

The detail of each process will be explained below.

(a) Press Forming Process

Figure 4:
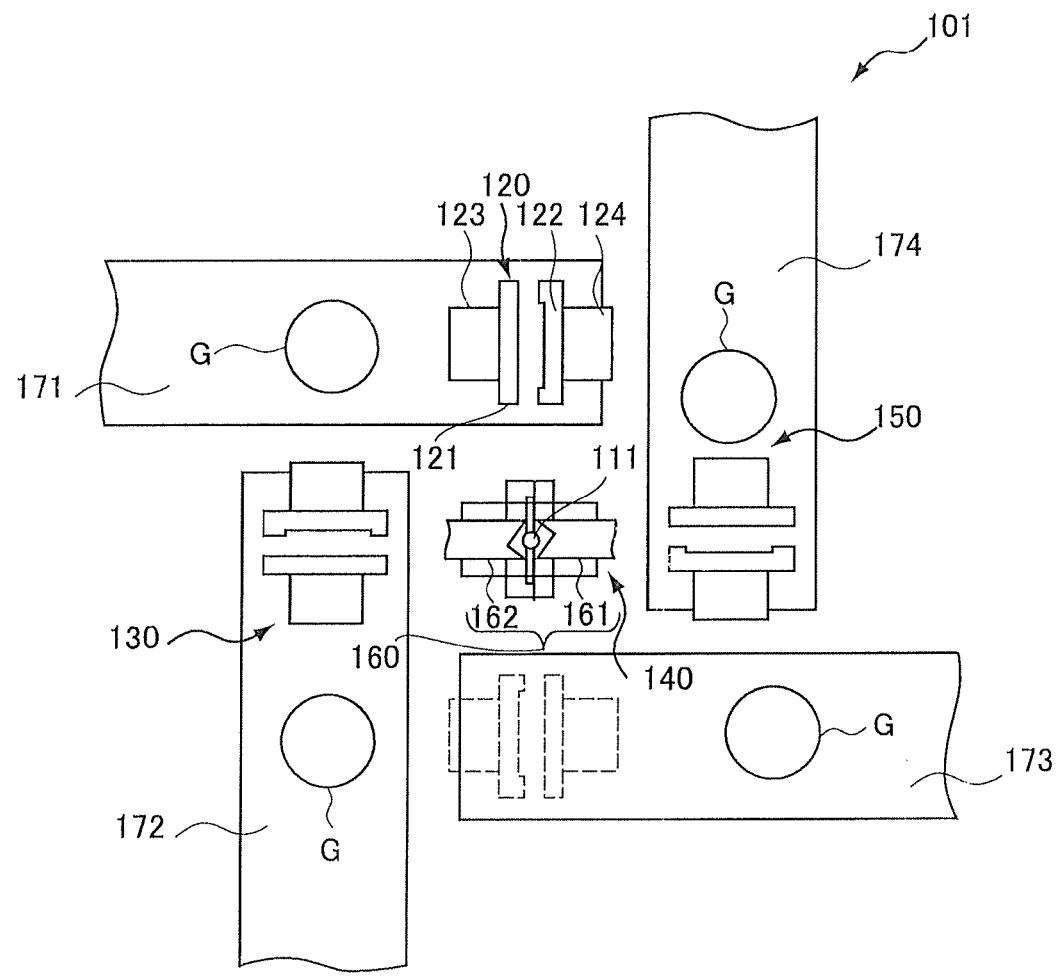
FIG. 4 is a plan view of an apparatus used in press forming.

Referring now to FIG. 4, the press forming process (Step S10) will be explained. FIG. 4 is a plan view of an apparatus used in press forming. As illustrated in FIG. 4, an apparatus 101 includes four sets of pressing units 120, 130, 140, and 150 and a cutting unit 160.

The cutting unit 160 is provided on a path of the molten glass that flows out from a molten glass outflow port 111. A lump of the molten glass is cut by the cutting unit 160 to drop down. Each of the pressing units 120, 130, 140, and 150 sandwiches the lump of the molten glass from both sides of the dropping path of the lump with facing surfaces of a pair of dies at the same timing, thereby forming the sheet glass material.

In the example illustrated in FIG. 4, the four sets of pressing units 120, 130, 140, and 150 are provided at intervals of 90 degrees around the molten glass outflow port 111.

Here, viscosity of the molten glass may preferably range from 500 dPa·s to 1,050 dPa·s.

Each of the pressing units 120, 130, 140, and 150 is driven by a moving mechanism (not illustrated) so as to be able to proceed and retreat with respect to the molten glass outflow port 111. That is, each of the pressing units 120, 130, 140, and 150 can be moved between a catch position and a retreat position. The catch position (position where the pressing unit 140 is drawn by a solid line in FIG. 4) is located immediately below the molten glass outflow port 111. The retreat position (positions where the pressing units 120, 130, and 150 are drawn by solid lines in FIG. 4 and a position where the pressing units 140 is drawn by a broken line in FIG. 4) is located away from the molten glass outflow port 111.

The cutting unit 160 is provided on a path of the molten glass between the catch position and the molten glass outflow port 111. The cutting unit 160 forms the lump (hereinafter also referred to as "gob") of the molten glass by cutting a proper quantity of the molten glass flowing out from the molten glass outflow port 111. The cutting unit 160 includes a first cutting blade 161 and a second cutting blade 162. The first cutting blade 161 and the second cutting blade 162 are driven so as to intersect each other on the path of the molten glass at constant timing. When the first cutting blade 161 and the second cutting blade 162 intersect each other, the molten glass is cut to obtain the gob. The obtained gob drops down toward the catch position.

Figure 5A:
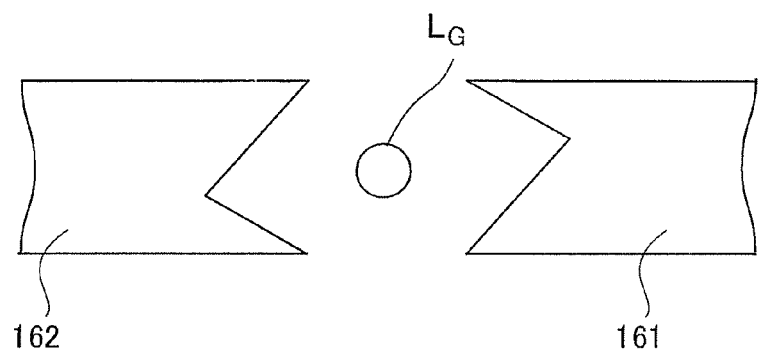
FIG. 5A is a plan view illustrating an arrangement before molten glass and a cutting unit contact.
Figure 5B:
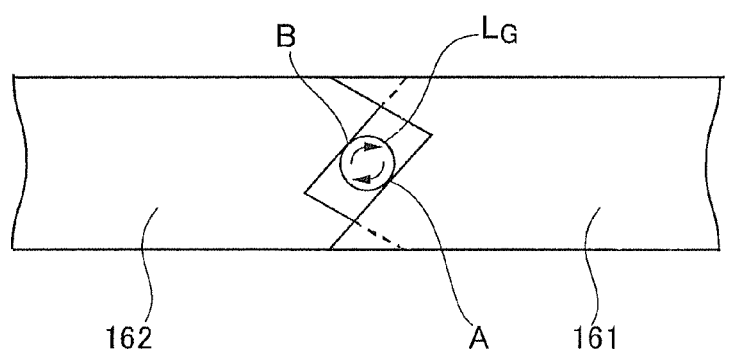
FIG. 5B is a plan view illustrating an arrangement when the molten glass and the cutting unit contact.
Figure 5C:
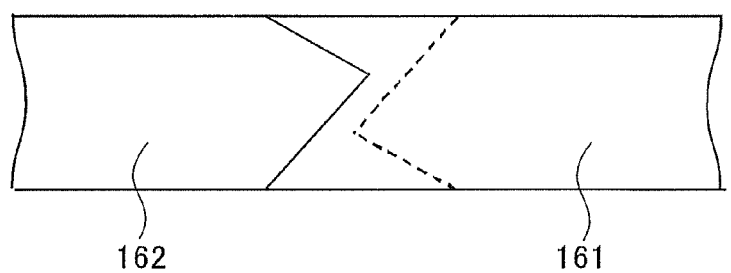
FIG. 5C is a plan view illustrating an arrangement after the cutting unit cut the molten glass.

Here, shapes of the first cutting blade 161 and the second cutting blade 162 according to the present embodiment will be explained with reference to FIGS. 5A to 5C. FIG. 5A is a plan view illustrating an arrangement before molten glass and a cutting unit contact. FIG. 5B is a plan view illustrating an arrangement when the molten glass and the cutting unit contact. FIG. 5C is a plan view illustrating an arrangement after the cutting unit cut the molten glass.

In an example illustrated in FIG. 5A, the first cutting blade 161 and the second cutting blade 162, which are facing, have point symmetrical shapes each other with respect to a position where the molten glass $L_G$ is supplied.

As illustrated in FIG. 5B, the molten glass $L_G$ and the first cutting blade 161 contact at the point A in FIG. 5B when the blade is slanting with regard to a moving direction (crosswise direction in FIG. 5B) of the first cutting blade 161. The molten glass $L_G$ and the second cutting blade 162 contact at the point B in FIG. 5B when the blade is slanting with regard to a moving direction (crosswise direction in FIG. 5B) of the second cutting blade 162. Thus, when the cutting unit 160 cuts the molten glass $L_G$, the molten glass $L_G$ is cut while revolving in the direction illustrated with arrows in FIG. 5B. Consequently, a lump of the molten glass (gob) $G_G$ drops down while revolving around its axis of dropping.

As illustrated in FIG. 5C, the first cutting blade 161 and the second cutting blade 162 intersects completely to form the lump of the molten glass (gob) $G_G$ from the molten glass $L_G$.

Note that, as illustrated in FIGS. 5B and 5C, the first cutting blade 161 is located above the second cutting blade 162 in the vertical direction. In the drawings, the broken lined part of the second cutting blade 162 is overlapped with the first cutting blade 161 beneath the first cutting blade 161 in the vertical direction.

Figure 6A:
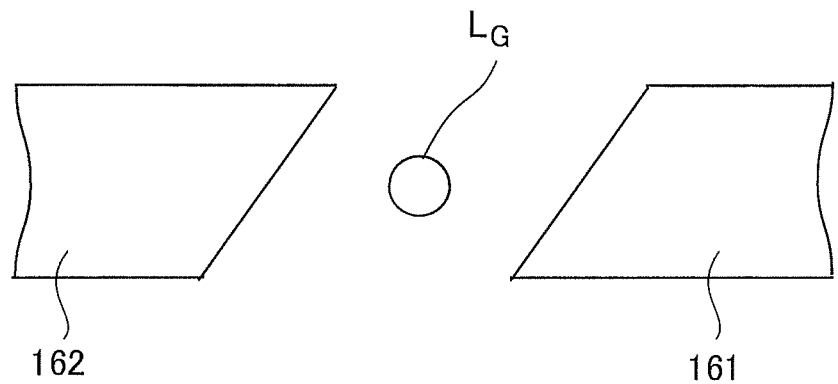
FIGS. 6A and 6B are views illustrating modified cutting units.
Figure 6B:
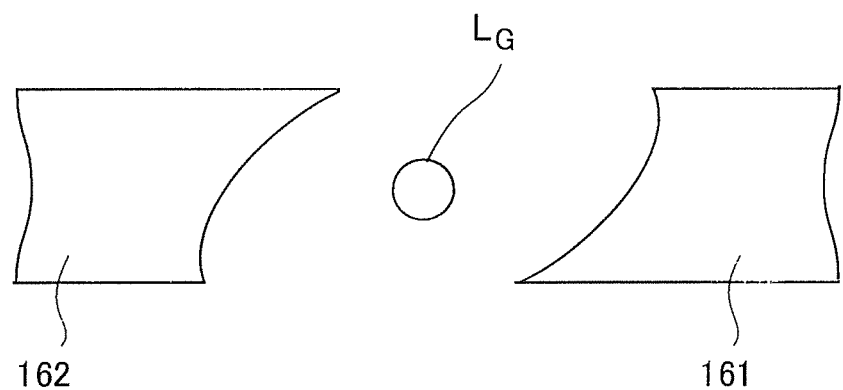

Note that the shapes of the first cutting blade 161 and the second cutting blade 162 are not limited to those illustrated in FIG. 5A. FIGS. 6A and 6B are plan views illustrating modified examples of the first cutting blade 161 and the second cutting blade 162. In an example illustrated in FIG. 6A, the first cutting blade 161 and the second cutting blade 162 have shapes linearly slanting with regard to a moving direction. In an example illustrated in FIG. 6B, the first cutting blade 161 and the second cutting blade 162 have curved shapes with regard to a moving direction of each cutting blade.

The cutting blades of examples illustrated in FIGS. 6A and 6B functions in the same fashion as those illustrated in FIG. 5A.

Referring back to FIG. 4, the press unit 120 will be explained. The pressing unit 120 includes a first die 121, a second die 122, a first driving unit 123, and a second driving unit 124. Each of the first die 121 and the second die 122 is a plate-shaped member including a surface used to perform the press forming for the gob. The first die 121 and the second die 122 are disposed such that normal directions of the surfaces become substantially horizontal, and such that the surfaces become parallel to each other.

The first driving unit 123 causes the first die 121 to proceed and retreat with respect to the second die 122. On the other hand, the second driving unit 124 causes the second die 122 to proceed and retreat with respect to the first die 121. Each of the first driving unit 123 and the second driving unit 124 includes a mechanism for causing the surface of the first driving unit 123 and the surface of the second driving unit 124 to be rapidly brought close to each other. Each of the first driving unit 123 and the second driving unit 124 is, for example, a mechanism in which an air cylinder or a solenoid and a coil spring are combined.

Because the structures of the pressing units 130, 140, and 150 are similar to that of the pressing unit 120, the descriptions of the pressing units 130, 140, and 150 are omitted.

After each pressing unit moves to the catch position, the dropping gob is sandwiched between the first die and the second die by driving the first driving unit and the second driving unit, and the gob is formed into a predetermined thickness while rapidly cooled, thereby preparing the disk-shaped sheet glass material G. Then, after the pressing unit moves to the retreat position, the first die and the second die are separated to cause the formed sheet glass material G to drop down.

A first conveyer 171, a second conveyer 172, a third conveyer 173, and a fourth conveyer 174 are provided below the retreat positions of the pressing units 120, 130, 140, and 150, respectively. Each of the first to fourth conveyers 171 to 174 receives the sheet glass material G dropping down from the corresponding pressing unit, and the conveyer conveys the sheet glass material G to an apparatus (not illustrated) of the next process.

In the present embodiment, the apparatus 101 is configured such that the pressing units 120, 130, 140, and 150 sequentially move to the catch position and move to the retreat position while the gob is sandwiched. Thus, the sheet glass material G can continuously be formed without waiting for the cooling of the sheet glass material G in each pressing unit.

Note that the sheet glass material G may be continuously be formed by sandwiching the gob by use of a single press unit 120. In this case, the first die 121 and the second die 122 are opened immediately after the press forming of the gob $G_G$, and press forms the subsequently dropping lump of the molten glass.

Here, referring to the side views illustrated in FIGS. 7A to 7C, the press forming process according to the present embodiment will be explained. FIG. 7A is a side view illustrating an arrangement before a molten glass $L_G$ and a cutting unit 160 contact. FIG. 7B is a side view illustrating an arrangement after the cutting unit 160 cut the molten glass $L_G$. FIG. 7C is a side view illustrating an arrangement when a pressing unit 120 performs press forming for a lump $G_G$ of the molten glass.

As illustrated in FIG. 7A, a molten glass $L_G$ continuously flows out from the molten glass outflow port 111. As illustrated in FIG. 7B, the cutting unit 160 is driven at predetermined timing to cut the molten glass $L_G$ using the cutting blades 161 and 162. Therefore, the cut molten glass becomes a substantially spherical gob $G_G$ due to a surface tension thereof. In the example illustrated in FIG. 7B, an outflow quantity per time of the molten glass $L_G$ and a driving interval of the cutting unit 160 are adjusted such that a gob $G_G$ having a radius of about 10 mm is formed every time the cutting unit 160 is driven.

Note that, as already explained with reference to FIG. 5B, the molten glass $L_G$ in the present embodiment is cut while revolving around its axis of dropping. Thus, as illustrated in FIG. 7B, the gob $G_G$ drops down toward the gap between the first die 121 and the second die 122 of the press unit 120 while revolving around its axis of dropping.

The first driving unit 123 and the second driving unit 124 are driven such that the first die 121 and the second die 122 come close to each other at the timing the gob $G_G$ enters the gap between the first die 121 and the second die 122. Therefore, as illustrated in FIG. 7C, the gob $G_G$ is captured (caught) between the first die 121 and the second die 122. Further, An inner circumferential surface 121a of the first die 121 and an inner circumferential surface 122a of the second die 122 come close to each other with a micro gap. Then, the gob $G_G$, which is sandwiched between the inner circumferential surface 121a of the first die 121 and the inner circumferential surface 122a of the second die 122, is formed into a thin-plate shape.

A projected spacer 122b is provided in the inner circumferential surface 122a of the second die 122 in order to keep the gap constant between the inner circumferential surface 121a of the first die 121 and the inner circumferential surface 122a of the second die 122. The spacer 122b of the second die abuts on the inner circumferential surface 121a of the first die 121, whereby the gap between the inner circumferential surface 121a of the first die 121 and the inner circumferential surface 122a of the second die 122 is kept constant to form a disk-shaped space.

A temperature control mechanism (not illustrated) is provided in each of the first die 121 and second die 122, and temperatures at the first die 121 and second die 122 may be preferably retained sufficiently lower than a glass transition temperature $T_G$ of the molten glass $L_G$.

A time until the gob $G_G$ is completely confined between the first die 121 and the second die 122 after the gob $G_G$ comes into contact with the inner circumferential surface 121a of the first die 121 or the inner circumferential surface 122a of the second die 122, is as extremely short as about 0.06 second. Therefore, the gob $G_G$ is formed into the substantially disk shape by spreading along the inner circumferential surface 121a of the first die 121 and the inner circumferential surface 122a of the second die 122 within an extremely short time, and the gob $G_G$ is rapidly cooled and solidified in the form of amorphous glass, thereby preparing the disk-shaped sheet glass material G.

Note that, in the present embodiment, for example, the formed sheet glass material G is a disk-shaped plate having a diameter of 75 to 80 mm and a thickness of about 1 mm.

After the first die 121 and the second die 122 are closed, the pressing unit 120 quickly moves to the retreat position, instead the pressing unit 130 moves to the catch position, and the pressing unit 130 performs the pressing to the gob $G_G$.

After the pressing unit 120 moves to the retreat position, the first die 121 and the second die 122 are kept closed until the sheet glass material G is sufficiently cooled (for example, until the sheet glass material G becomes at least a temperature below a yield point). Then, the first driving unit 123 and the second driving unit 124 are driven to separate the first die 121 and the second die 122, the sheet glass material G drops down from the pressing unit 120, and the conveyer 171 located below the pressing unit 120 receives the sheet glass material G (see FIG. 4).

In the present embodiment, the first die 121 and the second die 122 are closed within a time as extremely short as 0.1 second (about 0.06 second), and the molten glass substantially simultaneously comes into contact with the whole of the inner circumferential surface 121a of the first die 121 and the whole of the inner circumferential surface 122a of the second die 122. This prevents the inner circumferential surface 121a of the first die 121 and the inner circumferential surface 122a of the second die 122 from locally heated, and a deformation is therefore hardly generated in the inner circumferential surface 121a and the inner circumferential surface 122a.

Because the gob $G_G$ is formed into the disk shape before the heat transfers from the gob $G_G$ to the first die 121 and the second die 122, a temperature distribution of the formed molten glass becomes substantially even. Therefore, in cooling the molten glass, the shrinkage quantity of the glass material has the small distribution, and the large deformation is unlikely to occur. Accordingly, the flatness of the principal surface of the prepared sheet glass material G is improved compared with the sheet glass material prepared by the conventional press forming, and the target flatness of the principal surface necessary as the glass substrate for magnetic disk can be realized.

The surface roughness of the inner circumferential surface 121a and the surface roughness of the inner circumferential surface 122a can be adjusted such that the arithmetic average roughness Ra of the sheet glass material G becomes 0.01 μm to 10 μm, preferably 0.01 μm to 1 μm.

Here, conventionally, when cutting the molten glass $L_G$ using the first cutting blade 161 and the second cutting blade 162 that intersect to each other, the formed gob $G_G$ immediately after being cut may be given initial horizontal component of velocity with the second cutting blade 162 located below in the vertical direction. In the present embodiment, because the molten glass $L_G$ is cut with the cutting unit 160 while revolving around its axis of dropping while revolving, it is possible to reduce initial horizontal component of velocity of the formed gob $G_G$ immediately after being cut. Consequently, it becomes possible to restrain horizontal displacement during gob $G_G$ drops down.

Further, because the gob $G_G$ drops down while revolving around its axis of dropping, it becomes possible to restrain the above horizontal displacement compared with the case in which the gob drops down without revolving.

Therefore, in the press forming process, a position where the gob $G_G$ is pressed by the press unit is made fixed in the horizontal and vertical direction, thereby improving uniformity of thickness of the sheet glass material G prepared.

(b) Scribing Process

Next, scribing process (Step 20) will be explained. After the press forming, scribing is performed to the formed sheet glass material G in the scribing process.

As used herein, the scribing means that two concentric (inside concentric and outside concentric), cutting-plane lines (scratch in the form of a line) are provided in the surface of the sheet glass material G with a scriber made of a super alloy or diamond particles in order to obtain the ring-shape of the formed sheet glass material G having a predetermined size. The sheet glass material G scribed into two-concentric-circle shape is partially heated, and a portion outside the outside concentric circle and a portion inside the inside concentric circle are removed utilizing a difference in thermal expansion of the sheet glass material G, thereby obtaining the ring-shaped sheet glass material.

Note that a sheet glass material may be processed to have an outer diameter and uniformity, the degree of which scribing is not required for, and the ring-shaped sheet glass material may be obtained by forming an inner hole with a coring machine (drill) to the above sheet glass material.

(c) Shape Processing Process (Chamfering Process)

Next, a shape processing process (Step S30) will be explained. Then shape processing is performed to the scribed sheet glass material G. The shape processing includes chamfering (chamfering of outer circumferential end portion and inner circumferential end portion).

The outer circumferential end portion and inner circumferential end portion of the ring-shaped sheet glass material G are chamfered using a diamond abrasive grain.

(d) Grinding Process Using Fixed Abrasive Grain

Next, a grinding process using fixed abrasive grain (Step S40) will be explained. In the grinding process using fixed abrasive grain, grinding is performed to the ring-shaped sheet glass material G using the fixed abrasive grain. For example, in the grinding using the fixed abrasive grain, machining allowance is several micrometers to about 100 micrometers. For example, the fixed abrasive grain has the particle size of about 10 µm.

Figure 8A:
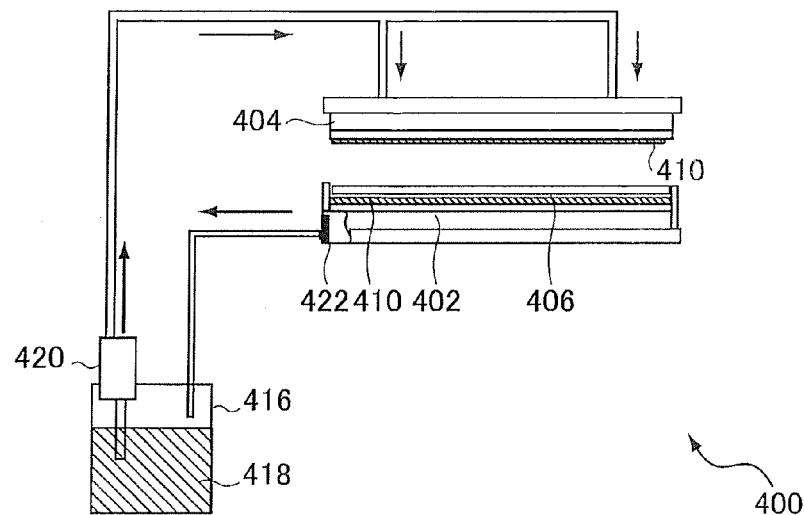
FIG. 8A is an overall view of an apparatus used to perform grinding using a fixed abrasive grain.
Figure 8B:
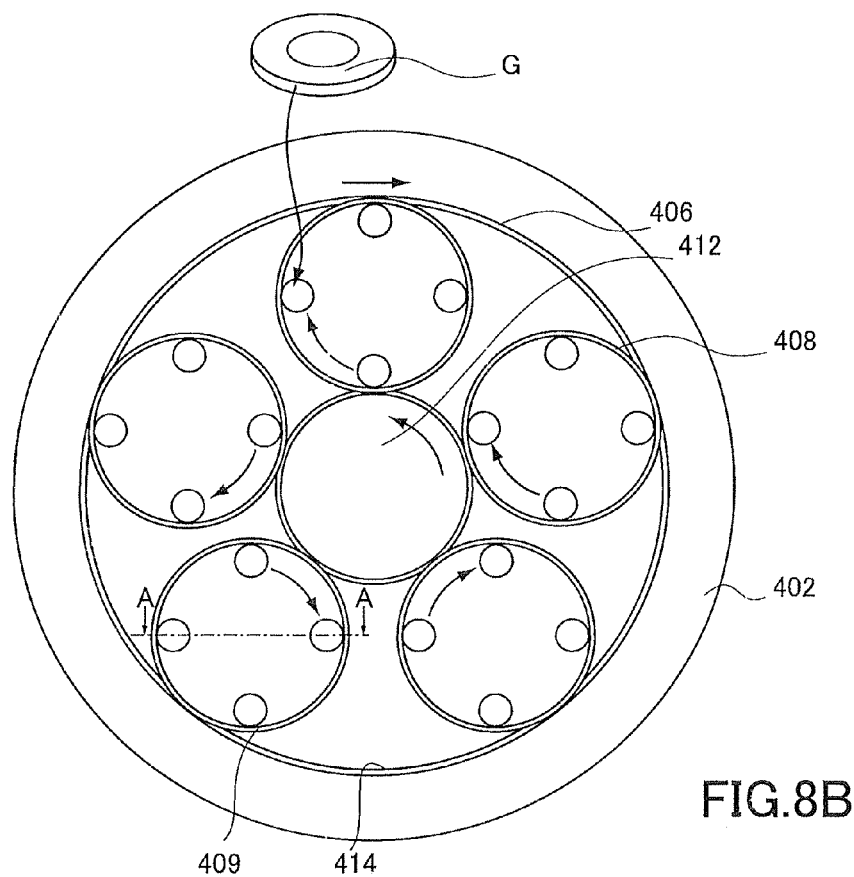
FIG. 8B is a view illustrating a carrier used in the apparatus of FIG. 8A.
Figure 9:
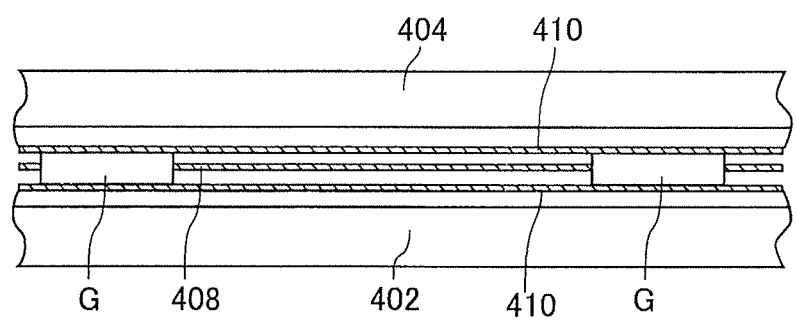
FIG. 9 is a view illustrating an arrangement in which a sheet glass material is ground.

Here, with reference to FIGS. 8A, 8B, and 9, the process for grinding the sheet glass material G will be explained. FIG. 8A is an overall view of an apparatus used to perform grinding using a fixed abrasive grain. FIG. 8B is a view illustrating a carrier used in the apparatus of FIG. 8A. FIG. 9 is a view illustrating an arrangement in which a sheet glass material G is ground.

As illustrated in FIG. 8 and FIG. 9. an apparatus 400 includes a lower surface plate 402, an upper surface plate 404, an internal gear 406, a carrier 408, a diamond sheet 410, a sun gear 412, an internal gear 414, a reservoir 416, and a pump 420. The reservoir 416 includes coolant 418.

In the apparatus 400, the internal gear 406 is vertically sandwiched between the lower surface plate 402 and the upper surface plate 404. During the grinding, the plural carriers 408 are retained in the internal gear 406. In FIG. 8B, the five carriers 408 are retained.

The surface of the diamond sheet 410 bonded to the lower surface plate 402 and the upper surface plate 404 in a planar manner constitutes a grinding surface. That is, the sheet glass material G is ground by the fixed abrasive grain using the diamond sheet 410.

As illustrated in FIG. 8B, the plural sheet glass materials G to be ground is retained while disposed in a circular hole provided in each carrier 408. During the grinding, the pair of principal surfaces of the sheet glass material G abuts on the diamond sheet 410 while being sandwiched between the lower surface plate 402 and the upper surface plate 404.

On the other hand, the sheet glass material G is retained on the lower surface plate 402 by the carrier 408 that includes a gear 409 in its outer circumference. The carrier 408 engages with the sun gear 412 and internal gear 414, which are provided in the lower surface plate 402. When the sun gear 412 is rotated in an arrow direction, each carrier 408 revolves around the sun gear 412 while rotating in an arrow direction as a planet gear. Therefore, the sheet glass material G is ground using the diamond sheet 410.

As illustrated in FIG. 8A, in the apparatus 400, a pump 420 supplies the coolant 418 in the reservoir 416 to the upper surface plate 404, and the pump 420 recovers the coolant 418 from the lower surface plate 402 to return the coolant 418 to the reservoir 416, thereby circulating the coolant 418. At this point, the coolant 418 removes swarf generated in the grinding from the grinding surface. Specifically, in the apparatus 400, when the coolant 418 is circulated, the filter 422 provided in the lower surface plate 402 filtrates the coolant 418 to retain the swarf in the filter 422.

In the grinding apparatus 400, the grinding is performed using the diamond sheet 410. Alternatively, the fixed abrasive grain of the diamond particles may be used instead of the diamond sheet 410. For example, a pellet that is formed by binding the diamond particles with a resin can be used in the grinding using the fixed abrasive grain.

(e) Edge Polishing Process

Next, an edge polishing process (Step S50) will be explained. In the edge polishing process, edge polishing is performed to the sheet glass material G.

In the edge polishing, mirror surface finishing is performed to an inner-circumferential-side end face and an outer-circumferential-side end face of the sheet glass material G by brush polishing. At this point, slurry that includes fine particles such as cerium oxide as the loose abrasive grain is used. The contamination of dust and damage such as a flaw are removed by performing the edge polishing. Therefore, generation of ions such as a sodium and potassium which cause corrosion can be prevented.

(f) First Polishing (Principal Surface Polishing) Process

Next, a first polishing process (Step S60) will be explained. In the first polishing process after the edge polishing process, the first polishing is performed to the ground principal surface of the sheet glass material G. For example, machining allowance in the first polishing is several micrometers to about 50 micrometers.

The first polishing is intended to remove the flaw left on the principal surface after the grinding using the fixed abrasive grain and the deformation. The apparatus 400 used in the grinding (Step S40) using the fixed abrasive grain is used in the first polishing. At this point, the first polishing differs from the grinding using the fixed abrasive grain in the following points. That is, in the first polishing process, the slurry of the turbid loose abrasive grain is used instead of the fixed abrasive grain. In the first polishing process, the coolant is not used. In the first polishing process, the resin polisher is used instead of the diamond sheet 410.

For example, the slurry of the turbid fine particles such as cerium oxide (particle size: diameter of about 1 µm to about 2 µm) is used as the loose abrasive grain used in the first polishing.

(g) Chemically Strengthening Process

Next, a chemically strengthening process (Step S70) will be explained. In the chemically strengthening process after the first polishing process, the first polished sheet glass material G is chemically strengthened.

For example, a mixed solution of potassium nitride (60%) and sodium sulfate (40%) can be used as a chemically strengthening solution. In the chemically strengthening, for example, the chemically strengthening solution is heated to 300° C. to 400° C., the washed sheet glass material G is pre-heated to 200° C. to 300° C., and the sheet glass material G is dipped in the chemically strengthening solution for three to four hours. Preferably, in order that the whole principal surfaces of the sheet glass material G are chemically strengthened, the dipping is performed while the plural sheet glass materials G are accommodated in a holder by retaining the sheet glass materials G at the end faces.

When the sheet glass material G is dipped in the chemically strengthening solution, the lithium ion and the sodium ion in the surface layer of the sheet glass material G are replaced by the sodium ion and the potassium ion which have relatively large ion radiuses in the chemically strengthening solution, respectively, thereby strengthening the sheet glass material G.

The sheet glass material G to which the Chemically strengthening treatment is performed is washed. For example, after washing the sheet glass material G using the sulfuric acid, the sheet glass material G is washed using pure water and IPA (isopropyl alcohol).

(h) Second Polishing (Final Polishing) Process

Next, a second polishing process (Step S80) will be explained. In the second polishing process, the second polishing is performed to the sheet glass material G after being chemically strengthened and well washed. For example, machining allowance in the second polishing is about 1 μm.

The second polishing is intended to perform mirror surface polishing to the principal surface. The apparatus 400 that is used in the grinding (Step S40) using the fixed abrasive grain and the first polishing (Step S60) is used in the second polishing. The second polishing differs from the first polishing in terms of the kind and particle size of the loose abrasive grain, and hardness of the resin polisher.

For example, the slurry of the turbid fine particles such as colloidal silica (particle size: diameter of about 0.1 μm) is used as the loose abrasive grain used in the second polishing.

The polished sheet glass material G is then washed. A neutral detergent, pure water, and IPA are used in the washing.

The glass substrate for magnetic disk 2 having the surface irregularity, in which the flatness of the principal surface is 4 μm or less and the roughness of the principal surface is 0.2 nm or less, is obtained by the second polishing.

Then, as illustrated in FIG. 1, the magnetic layers 3A and 3B are deposited for magnetic disk 2 to prepare the magnetic disk 1.

The flow of the manufacturing method illustrated in FIG. 3 is described above. In the flow of FIG. 3, the scribing (Step S20) and the shape processing (Step S30) are performed between the grinding using the fixed abrasive grain (Step S40) and the first polishing (Step S60), and the chemically strengthening (Step S70) is performed between the first polishing (Step S60) and the second polishing (Step S80). However the sequence is not limited to the embodiment described above. As long as the grinding using the fixed abrasive grain (Step S40), the first polishing (Step S60), and the second polishing (Step S80) are performed in this order, the scribing (Step S20), the shape processing (Step S30), and the chemically strengthening (Step S70) may appropriately be reordered.

In the present embodiment, the two-time grinding (first grinding and second grinding) using the loose abrasive grain is not performed to the formed sheet glass material G unlike the conventional method, but the first polishing and the second polishing is performed to the formed sheet glass material G after the one-time grinding is performed using the fixed abrasive grain. The reason the one grinding process can be omitted is that, the sheet glass material, in which the principal surface has the target flatness as the glass substrate for magnetic disk, having the surface irregularity in which the roughness of the principal surface ranges from 0.1 μm to 10 μm, can be formed.

The machining allowance in the conventional grinding (first grinding process and second grinding process) and the polishing (first polishing process and second polishing process) exceeds 150 μm in order to resolve unsatisfactory level of the flatness of the formed sheet glass material. That is, the machining allowance is set larger in the conventional first grinding process and second grinding process. When the sheet glass material G is largely ground in the conventional processes, the crack deeply proceeds while the flatness is improved.

Therefore, the machining allowance is inevitably increased in the first polishing and the second polishing according to the conventional processes. The "roll-off problem" of the edge portion, in which the neighborhood of the outer circumferential edge portion is rounded in the glass substrate, is caused by the large machining allowance in the polishing according to the conventional processes. The reason why the neighborhood of the outer circumferential edge portion is rounded is because the hard or soft resin polisher is used in performing the above first polishing and the second polishing.

In the method of the present embodiment, the principal surface of the formed sheet glass material is ground using the fixed abrasive grain, and the first polishing can be performed to the ground principal surface of the sheet glass material. Therefore, in the method of the present embodiment, the machining allowance can be decreased in the grinding, and the machining allowance can be therefore ranging from 10 μm to 150 μm in the grinding, the first polishing, and the second polishing.

In the method of the present embodiment, because the gob drops down while revolving around its axis of dropping, a position where the gob is pressed by the press unit in the press forming process is fixed in the horizontal and vertical direction, thereby improving uniformity of thickness of the sheet glass material prepared.

EXAMPLES

Figure 10A:
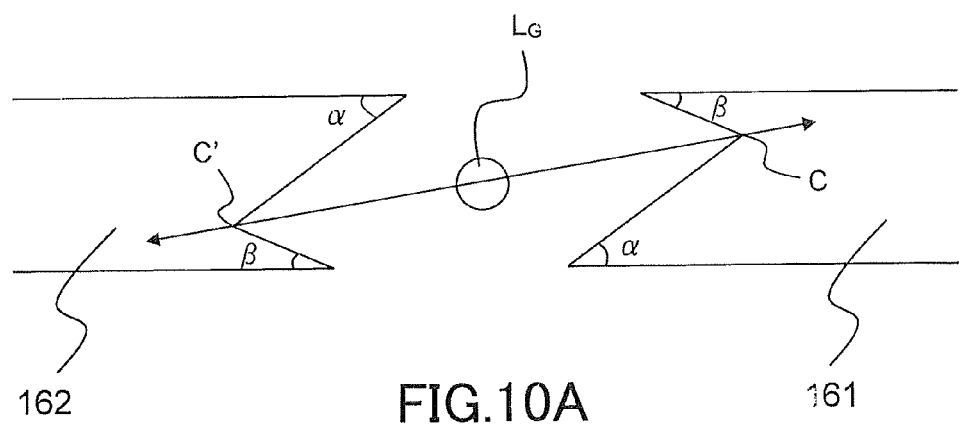
FIG. 10A is a plan view illustrating the cutting unit used for Example.
Figure 10B:
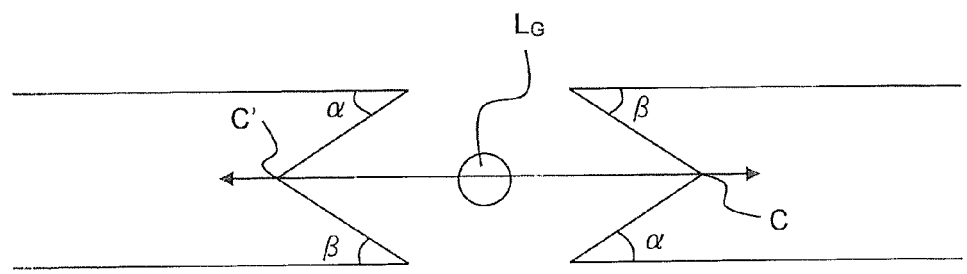
FIG. 10B is a plan view illustrating the cutting unit used for Comparative example.

Angles of the first cutting blade 161 and the second cutting blade 162 were changed to perform tests in order to confirm the advantageous effect of the present invention. First, with reference to FIGS. 10A and 10B, shapes of the cutting unit which was used for Examples and Comparative Examples will be explained. FIG. 10A is a plan view illustrating the cutting unit used for Example. FIG. 10B is a plan view illustrating the cutting unit used for Comparative example.

As illustrated in FIG. 10A, a basic shape of the cutting units of Examples are same as that of the cutting blade explained with reference to FIG. 5A. Each Example has a different angel of the cutting blade illustrated in FIG. 10A. A line formed by connecting a dent of the first cutting blade 161 (a point of C in FIG. 10A) and a dent of the second cutting blade 162 (a point of C' in FIG. 10A) is slanting with regard to the moving direction of each cutting blade (crosswise direction in the drawing).

Angle α and angle β of each Example is described in the below Table 1.

As illustrated in FIG. 10B, each of the cutting units of Comparative example has a difference angle of the cutting blade in FIG. 10B. A line formed by connecting dents of the cutting blades (points of C, C' in FIG. 10B) is parallel to the moving direction of each cutting blade (crosswise direction in the drawing).

Angle α and angle β of each Comparative example is described in the below Table 1.

Revolving speed of the gob formed by cutting the molten glass with the cutting blade of each Example and Comparative example was measured. Accuracy of position was also measured when 0.2 second had passed after cutting the molten glass with the cutting blade.

It was assumed that, with the Example and the Comparative example, the gob would have reached a press position 0.2 second after the molten glass was cut with the cutting blade. The accuracy of position was defined as displacement of the gob from a position below the molten glass outflow port in the vertical direction.

The revolving speed and the displacement of the gob were measured by use of a high-speed camera FASTCM manufactured by PHOTRON Limited.

With the Examples and Comparative examples, flatness of each of sheet glass materials after being pressed by the press unit was measured. The flatness was measured with a flatness tester FT-900 manufactured by NIDEK CO., LTD.

Described in the Table are angle α and angle β of each Example and each Comparative example, the revolving speed and the displacement of each gob, and flatness of each of sheet glass material.

TABLE 1

|  | Ex. 1 | Ex. 2 | Ex. 3 | Ex. 4 | Ex. 5 | Ex. 6 | Ex. 7 | Comp. Ex. 1 | Comp. Ex. 2 | Comp. Ex. 3 |
|---|---|---|---|---|---|---|---|---|---|---|
| Angle α | 30 | 30 | 45 | 45 | 45 | 60 | 60 | 45 | 60 | 75 |
| β | 0 | 15 | 0 | 15 | 45 | 0 | 15 | 45 | 60 | 75 |
| Revolving speed [rpm] | 150 | 143 | 90 | 75 | 53 | 38 | 30 | 0 | 0 | 0 |
| Accuracy of position | ±1 mm | ±1 mm | ±2 mm | ±2 mm | ±2 mm | ±4 mm | ±4 mm | ±20 mm | ±20 mm | ±20 mm |
| Flatness | 1.1 μm | 1.2 μm | 2.2 μm | 2.3 μm | 2.3 μm | 3.8 μm | 3.8 μm | 10.2 μm | 10.1 μm | 10.2 μm |

Ex.: Example, Comp. Ex.: Comparative Example

As described in Table 1, the revolving speed was 0 rpm with each Comparative example, and the gob dropped down while revolving with Examples. Therefore, with Example, the accuracy of position was improved, and the flatness of the sheet glass material was decreased compared with Comparative examples.

Further, based on the result with Examples 1 to 7, as the revolving speed of the gob became faster, the accuracy of position was more improved, and the flatness of the sheet glass material was more decreased.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alternations could be made hereto without departing from the spirit and scope of the invention.

What is claimed is:

1. A manufacturing method of a sheet glass material for a magnetic disk including a pair of principal surfaces, the method comprising:

performing a cutting process to cut molten glass to cause a lump of molten glass to drop; and performing a pressing process to form a sheet glass material by performing press forming on the lump of molten glass such that the lump of molten glass extends along flat inner surfaces of a pair of dies disposed along both sides of the dropping path by sandwiching the dropping lump of molten glass between the inner surfaces of the pair of dies at the substantially the same timing, the pair of dies facing each other and being set to substantially the same temperature, the molten glass being cut during the cutting process such that the lump of molten glass is shorter in a parallel direction to the inner surfaces than the sheet glass material is after being formed, and the molten glass being cut during the cutting process such that the lump of molten glass drops down while revolving around its dropping axis, and the cutting process is such that a revolving speed of the lump of molten glass is controlled.

2. The manufacturing method of a sheet glass material for a magnetic disk according to claim 1, wherein the dropping process includes cutting process for cutting molten glass with a first cutting blade and a second cutting blade intersected, the first cutting blade and the second cutting blade have shapes so as to cut the molten glass while revolving around its dropping axis.

3. The manufacturing method of sheet glass material for a magnetic disk according to claim 1 or 2, where the temperature of the pair of dies is lower than a glass transition temperature of the glass.

4. The manufacturing method of a sheet glass material for a magnetic disk according to claim 1, wherein the glass contains by molar percent, when converting to oxide standard, 50 to 75% $SiO_2$, 1 to 15% $Al_2O_3$, totally 12 to 35% component(s) selected from at least one of $Li_2O$, $Na_2O$, and $K_2O$, totally 0 to 20% component(s) selected from at least one of MgO, CaO, SrO, BaO, and ZnO, and totally 0 to 10% component(s) selected from at least one of $ZrO_2$, $TiO_2$, $La_2O_3$, $Y_2O_3$, $Ta_2O_5$, $Nb_2O_5$, $HfO_2$.

5. The manufacturing method of a sheet glass material for a magnetic disk according to claim 1, wherein viscosity of the molten glass ranges from 500 dPa·s to 1,050 dPa·s.

6. The manufacturing method of a sheet glass material for a magnetic disk according to claim 1, wherein the pair of dies are opened after the press forming of the lump of molten glass and press forms the subsequently dropping lump of molten glass to continuously form the sheet glass material.

7. The manufacturing method of a sheet glass material for a magnetic disk according to claim 1, wherein the pressing process is performed such that a distance is kept constant between the inner surfaces of the pair of dies.

8. The manufacturing method of a sheet glass material for a magnetic disk according to claim 1, wherein a distance is kept constant between the inner surfaces of the pair of dies with a spacer.

9. The manufacturing method of a sheet glass material for a magnetic disk according to claim 1, wherein the sheet glass material is formed during the pressing process such that a flatness of the principal surfaces of the sheet glass material after forming is 4 μm or less.

10. The manufacturing method of a sheet glass material for a magnetic disk according to claim 1, wherein the cutting process uses a first cutting blade and a second cutting blade, which are facing each other and have point-symmetrical shapes with each other with respect to a position where the molten glass is supplied are used in the cutting process, and includes linearly moving the first cutting blade and the second cutting blade linearly to the position where the molten glass is supplied.

11. The manufacturing method of a sheet glass material for a magnetic disk according to claim 1, wherein each of the inner surfaces of the pair of dies is an inner circumferential surface, and during the pressing process the pair of dies is closed within a time as short as 0.1 second and the molten glass substantially simultaneously comes into contact with an entirety of the inner circumferential surfaces of the pair of the dies.

12. A manufacturing method of a glass substrate for a magnetic disk, the method comprising:

performing a cutting process to cut molten glass to cause a lump of molten glass to drop;

performing a pressing process to form a sheet glass material by performing press forming on the lump of molten glass such that the lump of molten glass extends along flat inner surfaces of a pair of dies disposed along both sides of the dropping path by sandwiching the dropping lump of molten glass between the inner surfaces of the pair of dies at the substantially the same timing, the pair of dies facing each other and being set to substantially the same temperature;

grinding principal surfaces of the sheet glass material using a fixed abrasive grain;

and polishing, after the grinding, the principal surfaces of the sheet glass material using a loose abrasive grain, the molten glass being cut during the cutting process such that the lump of molten glass is shorter in a parallel direction to the inner surfaces than the sheet glass material is after being formed, and the molten glass being cut during the cutting process such that the lump of molten glass drops down while revolving around its dropping axis, and the cutting process is such that a revolving speed of the lump of molten glass is controlled.

13. The manufacturing method of a glass substrate for a magnetic disk according to claim 12, wherein the cutting process uses a first cutting blade and a second cutting blade, which are facing each other and have point-symmetrical shapes with each other with respect to a position where the molten glass is supplied are used in the cutting process, and includes linearly moving the first cutting blade and the second cutting blade linearly to the position where the molten glass is supplied.

14. The manufacturing method of a glass substrate for a magnetic disk according to claim 12, wherein each of the inner surfaces of the pair of dies is an inner circumferential surface, and during the pressing process the pair of dies is closed within a time as short as 0.1 second and the molten glass substantially simultaneously comes into contact with an entirety of the inner circumferential surfaces of the pair of the dies.

* * * * *